J. THOMSON.
Check-Row Attachment to Corn-Planters.
No. 223,190. Patented Dec. 30, 1879.
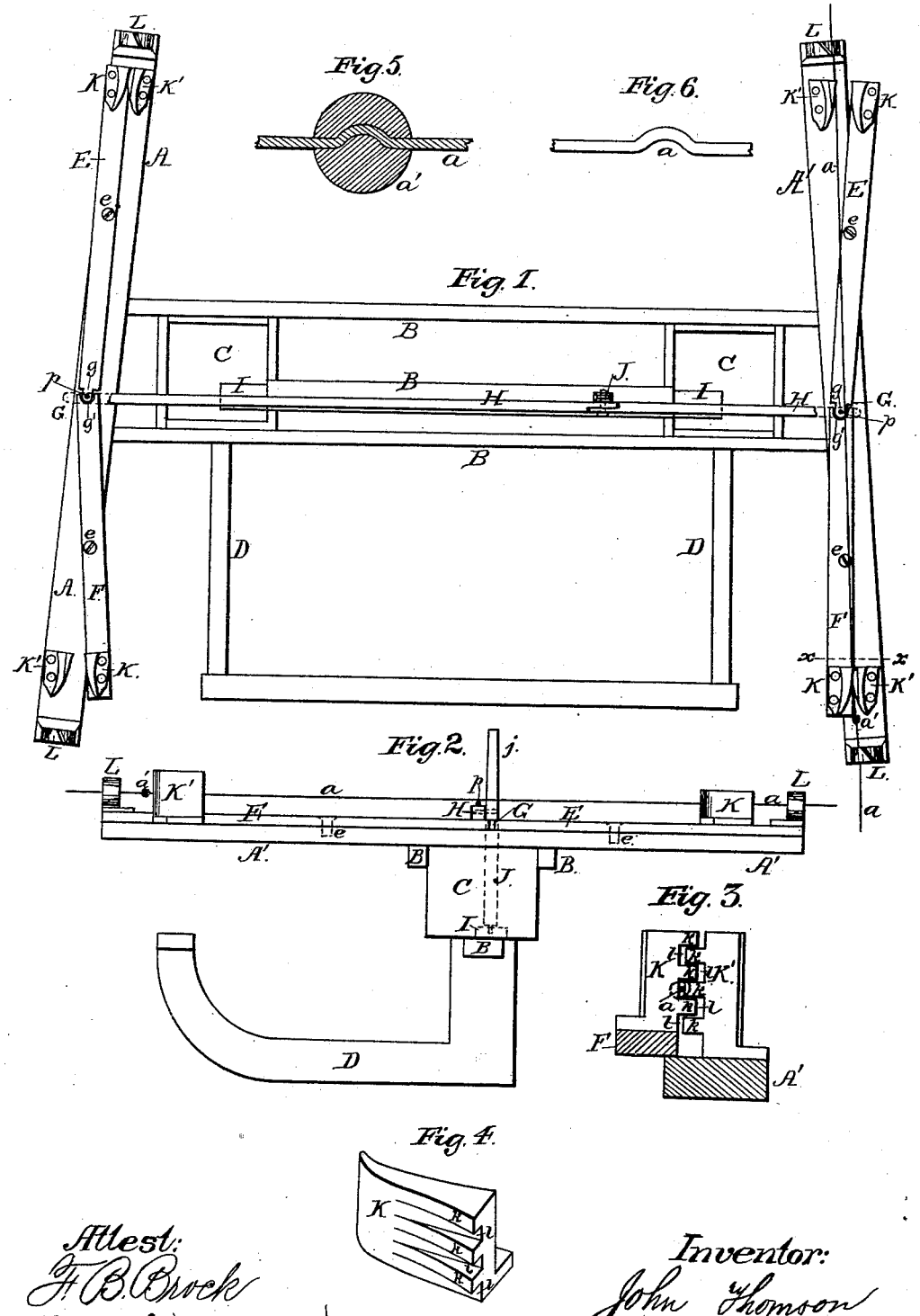

UNITED STATES PATENT OFFICE.

JOHN THOMSON, OF ALEDO, ILLINOIS, ASSIGNOR OF ONE-HALF OF HIS RIGHT TO JAMES A. SHERRIFF, OF SAME PLACE.

IMPROVEMENT IN CHECK-ROW ATTACHMENTS TO CORN-PLANTERS.

Specification forming part of Letters Patent No. 223,190, dated December 30, 1879; application filed October 30, 1879.

*To all whom it may concern:*

Be it known that I, JOHN THOMSON, of Aledo, in the county of Mercer and State of Illinois, have invented certain new and useful Improvements in Check-Row Attachments to Corn-Planters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 represents a top-plan view of the seeding devices of a check-row corn-planter, showing my improvements applied thereto, the wheel-frame being removed. Fig. 2 represents a side elevation of the same. Fig. 3 represents an enlarged section, looking toward the front of the machine, taken through the line $x\ x$ of Fig. 1. Fig. 4 represents a detail perspective view of one of the clamps which are operated upon by the check-row wire or cord, and thereby actuate, through intermediate mechanism, the seeding devices of the corn-planter. Fig. 5 represents a detail section through one of the knots or projections of the check-row wire, and Fig. 6 a detail view of the conformation of the wire at the point where the knot or projection is cast or secured.

My invention relates to check-row attachments for corn-planters.

The object of my invention is to provide a check-row attachment for corn-planters which will be sure in its action and prevent all liability on the part of the knotted check-row wire or cord to fail to operate upon the devices for actuating the seeding devices of the corn-planter.

My invention consists in a novel construction and arrangement of mechanism for operating the seeding devices of a check-row corn-planter.

It also consists in one or more pairs of ribbed cam-faced clamping-plates for operating the seeding devices through any suitable mechanism, said clamping-plates being actuated by the check-row wire.

It further consists in providing a check-row corn-planter with bell-shaped guide-rings for the knotted wire or cord, each of said guides having a diagonal slot for the introduction of the knotted wire into said guides.

To enable others skilled in the art to make, construct, and use my invention, I will now proceed to describe it in detail, omitting a particular description of such parts of a corn-planter as are old and common to the art.

In the accompanying drawings, A A' represent arms rigidly secured to the forward frame, B, of the seeding devices.

In the drawings the wheels and wheel-frame are not shown.

To the frame B are secured the seed-hoppers C and the devices for operating them, the whole being supported upon the runners D of the frame.

Upon each one of the arms A A' are mounted two oscillating arms, E and F, pivoted at $e$, the inner ends of which are provided with a flexible joint, made in any suitable and known way, but which I prefer to construct with a ball-and-socket joint, the one carrying the ball $g$ and the other the socket $g'$.

Each pair of arms E and F, on either side of the frame B, are connected by a jointed transverse bar, H, by means of pivotal pins $p$. This bar H traverses the frame B above the slide-bar I, and to which it is connected by the lever J. If desired, the lever J may be operated by the extension or handle $j$.

To the outer end of each oscillating bar is secured, in any suitable way, one of a pair of clamp-plates, K, which is fully illustrated in the drawings, the other or opposite one, K', of which is mounted and secured upon the stationary arms A A' of the frame. The clamps K K' are made flaring in shape at their front ends, or the end toward the front of the machine, for the purpose of facilitating the entrance and passage through of the knotted wire or cord $a$. The clamp-plates K K' are each provided with ribs or projections $k$ and corresponding depressions $l$, each of the clamps having the ribs and depressions so arranged with respect to each other that the ribs or projections $k$ of the one clamp-plate, K, take into corresponding depressions $l$ of the other, K', as the two are brought together.

Upon each end of the stationary arms A A' is mounted and secured a bell-mouthed guide-ring, L, for the holding and guidance of the knotted wire or cord $a$ to and from each pair of clamping-plates K K'. Each guide-ring L is provided with a diagonal slot, $b$, for the introduction of the knotted wire or cord, and serves to retain and prevent the latter from being withdrawn or thrown out during the operation of the machine.

A method is shown in Figs. 5 and 6 of forming the knots or projections in the check-row wire. For each knot a kink or bend is first made in the wire at the desired point. (See Fig. 6.) The kink or bend is then firmly and immovably embedded in any known and suitable way in a ball of metal or other suitable material; or, if desired, and in some respects it may be preferable, the knots or projections may be formed by casting the metal around the kinks or bends.

Thus constructed, the operation is as follows: The knotted check-row wire or cord $a$ is introduced into the bell-shaped-mouth guide-rings L of the arm A', and upon which a pair of oscillating arms, E and F, are pivoted, each arm carrying one of the vibrating clamp-plates K of each pair, K K'. A knot, $a'$, of the knotted check-row wire or cord $a$ (see Figs. 1 and 2) is shown as about to enter between the forward pair of clamp-plates K K'. As the machine advances, the knot $a'$ enters between said clamp-plates and forces the movable or oscillating clamp K away and apart from the stationary clamp K', allowing the knot $a'$ to pass through, closing the clamp-plates on the rear end of the arm A' of the frame by means of the joint G, which, in turn, gives an endwise motion to the bar H. This motion of bar H actuates the slide-bar I through the medium of lever J, and thus allows a pocket of seed to be deposited in the ground from the hoppers C. As the machine continues to advance, the same knot, $a'$, is brought between the pair of clamping-plates K K' on the rear end of arm A', the knotted cord being held and guided by the bell-shaped guide-rings L, when the same operation is performed as was just described in connection with the pair of clamps on the front end of arm A'. The slide-bar I then receives another throw, and thereby deposits another pocket of seed in the ground. The same motion closes the clamps K K' on the front of the frame, to be operated upon in the same manner by the next succeeding knot of the check-row wire.

The corn-planter, in recrossing the field to be planted, takes the knotted wire upon the opposite arm, A, and operates upon the clamping-plates upon said arm in the same manner, the bar H being common to both.

The clamping-plates K K' do not close sufficiently together to prevent the free passage through the depressions of the latter of the wire or cord between the knots.

The ribs or projections $k$ and depressions $l$ of the clamping-plates K K' are arranged with respect to each other so that ribs $k$ of the vibrating clamp take into corresponding depressions $l$ of the stationary one, and vice versa. This serves to allow the cam-faces of the vibrating clamps to move through a greater arc than would be the case were the cam-faces of the clamps not ribbed in the manner described. It also serves to prevent sudden vibrations or twitchings of the knotted cord, which tend to throw the latter out of the clamps and prevent the action of the slide-bar at the required time. By this arrangement the cord is always held in either one of the clamps by said ribs and depressions. The ribs also prevent the slipping out of the knotted wire when in the act of operating the clamps K K'.

Having described my invention, what I claim as new, and desire to secure by Letters Patent, is—

1. In a check-row corn-planter, the bell-mouth-shaped guide-rings L, provided with diagonally-cut slots, for the purposes set forth.

2. In a check-row planter, the cam-faced ribbed clamps K K', for the purposes set forth.

3. The combination of the guide-rings L with the ribbed clamps K K', levers E and F, stationary arm A, and actuating-rod H, substantially as set forth.

4. The combination, in a check-row planter, of the following devices, to wit: ribbed clamps K K', pivoted and flexibly-connected levers E and F, stationary arm A, slide-bar H, lever J, and slide-valve bar I, substantially as set forth.

In testimony that I claim the foregoing as my own I affix my signature in presence of two witnesses.

JOHN THOMSON.

Witnesses:
L. F. CHAMBERLIN,
DANEL ROSE.